(12) United States Patent
Ren et al.

(10) Patent No.: US 12,469,062 B2
(45) Date of Patent: Nov. 11, 2025

(54) MASS CUSTOMIZATION SYSTEM

(71) Applicants: Qingdao Haier Institute of Industrial Intelligence Co., Ltd., Shandong (CN); Haier Digital Technology (Qingdao) Co., Ltd., Shandong (CN); Haier Cosmo IOT Ecosystem Technology Co., Ltd., Shandong (CN)

(72) Inventors: Taolin Ren, Shandong (CN); Yong Wang, Shandong (CN); Ming Sun, Shandong (CN); Xiang Gan, Shandong (CN); Mizhen Wang, Shandong (CN)

(73) Assignees: Qingdao Haier Institute of Industrial Intelligence Co., Ltd., Shandong (CN); Haier Digital Technology (Qingdao) Co., Ltd., Shandong (CN); Haier Cosmo IOT Ecosystem Technology Co., Ltd., Shandong (CN)

( * ) Notice: Subject to any disclaimer, the term of this patent is extended or adjusted under 35 U.S.C. 154(b) by 755 days.

(21) Appl. No.: 17/596,503

(22) PCT Filed: Aug. 31, 2020

(86) PCT No.: PCT/CN2020/112388
§ 371 (c)(1),
(2) Date: Dec. 10, 2021

(87) PCT Pub. No.: WO2021/103719
PCT Pub. Date: Jun. 3, 2021

(65) Prior Publication Data
US 2022/0292563 A1    Sep. 15, 2022

(30) Foreign Application Priority Data
Nov. 28, 2019    (CN) .......................... 201911193372.X (51) Int. Cl.
*G06Q 30/06* (2023.01)
*B25J 13/08* (2006.01)
(Continued)

(52) U.S. Cl.
CPC .......... *G06Q 30/0621* (2013.01); *B25J 13/08* (2013.01); *B65G 1/1376* (2013.01);
(Continued)

(58) Field of Classification Search
None
See application file for complete search history.

(56) References Cited

U.S. PATENT DOCUMENTS 10,360,531 B1 * 7/2019 Stallman .............. G06Q 10/087
10,399,776 B2 * 9/2019 Issing ................. B65G 1/1376
(Continued)

FOREIGN PATENT DOCUMENTS

CN    102117433    7/2011
CN    103838190 A    6/2014
(Continued)

OTHER PUBLICATIONS

Li, Junliang; Design and Implementation of Intelligent Manufacturing Production Line Control System Based on Digital Measurement; with Englsh Abstract.
(Continued)

*Primary Examiner* — Howard Cortes
(74) *Attorney, Agent, or Firm* — ArentFox Schiff LLP (57) ABSTRACT

Provided is a mass customization system. The mass customization system includes a raw material stereoscopic warehouse module, an accessory assembly module, and a customization and detection module. The raw material stereoscopic warehouse module is configured to store a plurality of components for a plurality of types of products and pick out components of a target product according to order
(Continued)

information. The accessory assembly module is configured to receive and assemble the components of the target product to obtain the target product. The customization and detection module is configured to perform product customization on the target product according to customization information carried in the order information.

7 Claims, 5 Drawing Sheets

(51) Int. Cl.
    *B65G 1/137*     (2006.01)
    *B65G 37/02*     (2006.01)
    *B65G 43/08*     (2006.01)
    *G06Q 10/087*     (2023.01)
    *G06Q 30/0601*     (2023.01)

(52) U.S. Cl.
    CPC ............. *B65G 37/02* (2013.01); *B65G 43/08* (2013.01); *G06Q 10/087* (2013.01); *B65G 2203/041* (2013.01); *B65G 2209/04* (2013.01); *B65G 2812/01* (2013.01)

(56) References Cited

U.S. PATENT DOCUMENTS

| | | | | |
|---|---|---|---|---|
| 11,643,228 | B1* | 5/2023 | New ...................... | G01G 21/22 53/452 |
| 2008/0077511 | A1* | 3/2008 | Zimmerman ........ | G06Q 10/087 705/28 |
| 2011/0282476 | A1* | 11/2011 | Hegemier .......... | G06Q 30/0621 705/26.5 |
| 2015/0101134 | A1* | 4/2015 | Manz .................... | A43D 95/00 12/142 R |
| 2015/0310599 | A1* | 10/2015 | Yamamoto ................ | G06T 7/74 348/94 |
| 2017/0147969 | A1* | 5/2017 | Narsingh ............. | G06Q 10/087 |
| 2017/0322561 | A1* | 11/2017 | Stiernagle .......... | G06Q 10/0875 |
| 2018/0186004 | A1* | 7/2018 | Park .......................... | G06T 7/80 |
| 2018/0208346 | A1* | 7/2018 | Scaife .................... | A41D 13/11 |
| 2018/0215545 | A1* | 8/2018 | High .................... | G05D 1/0261 |
| 2018/0257225 | A1* | 9/2018 | Satou ..................... | B25J 9/1697 |
| 2018/0314867 | A1* | 11/2018 | Kotula ................. | G06K 7/1413 |
| 2019/0308320 | A1* | 10/2019 | Konishi ................ | G06V 20/64 |
| 2020/0082450 | A1* | 3/2020 | Schmidt ............. | G06Q 30/0621 |
| 2020/0271519 | A1* | 8/2020 | Aiso ....................... | G01N 21/25 |
| 2020/0275775 | A1* | 9/2020 | Marriott .................. | A47F 10/02 |
| 2021/0046646 | A1* | 2/2021 | Prechtl ................. | B25J 15/0616 |

FOREIGN PATENT DOCUMENTS

| | | |
|---|---|---|
| CN | 105416958 A | 3/2016 |
| CN | 107016492 A | 8/2017 |
| CN | 107292702 A | 10/2017 |
| CN | 107967860 | 4/2018 |
| CN | 107967860 A | 4/2018 |
| CN | 110449577 | 11/2019 |
| CN | 111210294 A | 5/2020 |
| WO | 2012024820 A1 | 3/2012 |

OTHER PUBLICATIONS

Ma, Jing et al. Computer Integrated Manufacturing System, vol. 22 No. 1, Jan. 2016; Complexity Metrics for Assembly System of Mechanical Products Based on IOT Entropy; with Englsh Abstract.
The Application of Artificial Intelligence Technology in the Smart Manufacture Demo Line; with Englsh Abstract.
International Search Report issued for PCT/CN2020/112388, mailed Nov. 30, 2020.

* cited by examiner

MASS CUSTOMIZATION SYSTEM

CROSS-REFERENCE TO RELATED APPLICATIONS

This is a U.S. National Stage Application, filed under 35 U.S.C. 371, of International Patent Application No. PCT/CN2020/112388, filed on Aug. 31, 2020, which claims priority to Chinese Patent Application No. 201911193372.X filed on Nov. 28, 2019, the contents of which are incorporated herein by reference in their entireties.

TECHNICAL FIELD

The present application relates to the field of product customization, for example, a mass customization system.

BACKGROUND

The gradual improvement of living standards has greatly enriched people's material life, making electronic products such as refrigerators, washing machines, televisions, and computers become standard configuration in families. People also raise their needs for materials to the level of personalized products.

Personalized customization refers to that a user gets involved in the production process of a product, specifies the parameters of the product and the appearance of the product, obtains the customized product with strong personal attributes, or obtains the product or service matching personal needs. For example, when purchasing a washing machine, the user may ask the manufacturer to print a specified pattern on the washing machine. Alternatively, when purchasing a washing machine, the user may specify parameters of the washing machine such as specifications, height, size, and power.

In the related art, the production mode of personalized customization products is to customize the products one by one according to user needs after mass production. Apparently, the personalized customization products in the market tend to be homogeneous currently and are unable to satisfy the increasing personalized needs of users. Moreover, the customization cost is excessively high, and the research and development cycle and the production cycle are long, which are disadvantageous for large-scale production.

SUMMARY

The present application provides a mass customization system that can provide a new mode of customization.

The mass customization system provided in an embodiment of the present application includes a raw material stereoscopic warehouse module, an accessory assembly module, and a customization and detection module.

The raw material stereoscopic warehouse module is configured to store a plurality of components for a plurality of types of products and pick out components of a target product according to order information.

The accessory assembly module is configured to receive and assemble the components of the target product to obtain the target product.

The customization and detection module is configured to perform product customization on the target product according to customization information carried in the order information.

DETAILED DESCRIPTION

Figure 1:
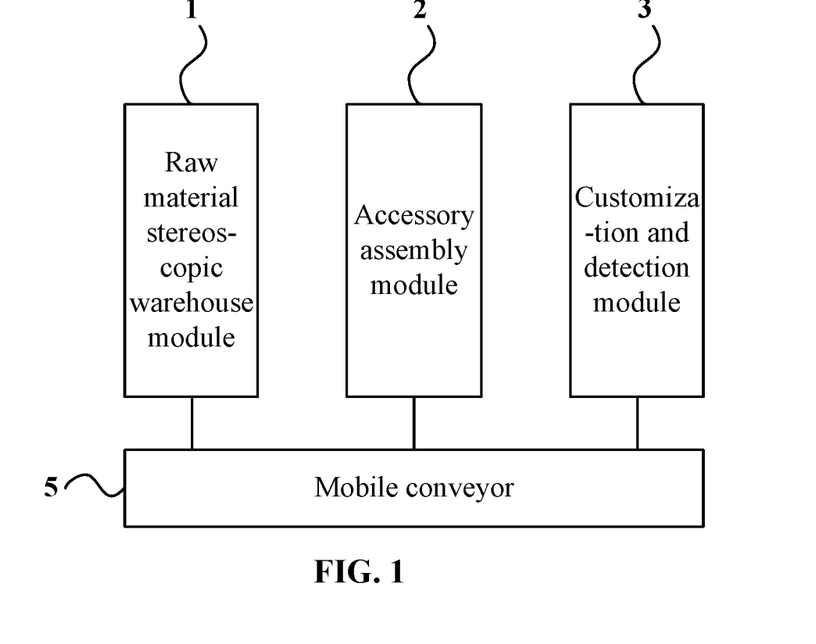
FIG. 1 is a schematic diagram of a mass customization system according to an embodiment of the present application.

Referring to FIG. 1, FIG. 1 is a schematic diagram of a mass customization system according to an embodiment of the present application. The mass customization system provided in this embodiment includes a raw material stereoscopic warehouse module 1, an accessory assembly module 2, and a customization and detection module 3. The raw material stereoscopic warehouse module 1 is configured to store a plurality of components for a plurality of types of products and pick out components of a target product according to order information. The accessory assembly module 2 is configured to receive and assemble the components of the target product to obtain the target product. The customization and detection module 3 is configured to perform product customization on the target product according to the customization information carried in the order information.

In this embodiment, the mass customization system obtains the order information directly and performs personalized customization on the product according to the order information.

The mass customization system includes the raw material stereoscopic warehouse module 1. The raw material stereoscopic warehouse module 1 stores a plurality of components for a plurality of types of products as well as stores a unique location address corresponding to each type of components. Exemplarily, a type of components refer to one or more components whose characteristics such as color, size, shape, and model are the very same. Two components whose colors are different from each other but other characteristics are the very same are classified as two types of components. After obtaining the order information, according to the order information, the raw material stereoscopic warehouse module 1 sequentially picks out and outputs the components of the target product consistent with the order information. For example, the raw material stereoscopic warehouse module 1 stores thirty sets of components of refrigerators and thirty sets of components of washing machines, the obtained order information is an order of one washing machine, and thus each component of one washing machine consistent with the order information is picked out. The order information includes the personalized customization information of a user. The product parameters of the components picked by the raw material stereoscopic warehouse module 1 are consistent with the personalized needs of the user. For example, the washing machine and the parameters of the washing machine, such as specifications, height, size and power, are limited in the user's order information, and then the raw material stereoscopic warehouse module 1 picks out the components consistent with the order information according to the user's order information.

The mass customization system includes the accessory assembly module 2. The accessory assembly module 2 is connected to the raw material stereoscopic warehouse module 1, receives the components of the target product picked by the raw material stereoscopic warehouse module 1, and then completes the assembly of the product according to the order information and the components of the target product. For example, the order information is one washing machine, and then the accessory assembly module 2 performs assembly on the received components of the washing machine according to the order information to obtain the washing machine consistent with the order information.

The mass customization system includes the customization and detection module 3. The customization and detection module 3 is connected to the accessory assembly module 2, receives the semi-finished product assembled by the accessory assembly module 2, and then performs product customization on the target product according to the customization information carried in the order information. The personalized customization described herein includes the customization of a signature, the customization of a color, head portrait printing, and parameters such as customized product specifications, height, size, and power.

In this embodiment, the mass customization system includes the raw material stereoscopic warehouse module 1, the accessory assembly module 2, and the customization and detection module 3, to implement the automatic process of component picking, assembly, and customization. The mass customization system may obtain the information of an order placed by a user in real-time. Accordingly, the mass customization system may perform product assembly and customization according to the order information in real-time, enabling that the scaled demand information of users is obtained before product production. Then large-scale production is performed in the manner of modular supply, enabling that personalized products are provided for users with high precision and high efficiency and that defects such as the slow efficiency of customization products in conveyance enterprises are improved.

Figure 2:
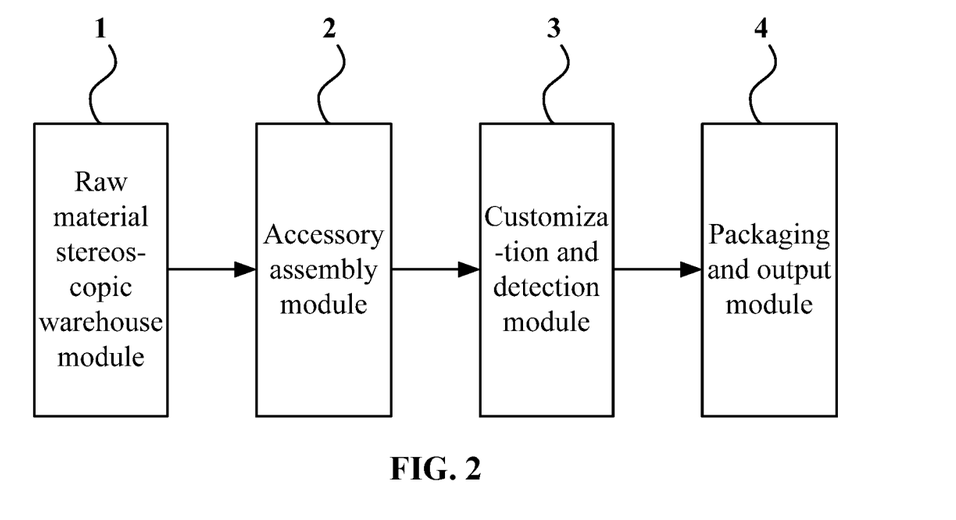
FIG. 2 is a schematic diagram of a mass customization system according to an embodiment of the present application.

Exemplarily, on the basis of the preceding technical schemes, as shown in FIG. 2, in an embodiment, the mass customization system further includes a packaging and output module 4 configured to perform packaging customization on a target product according to the customization information and then output a finished product.

In this embodiment, as for a personalized product, personalized customization may be performed for the appearance of the product and the internal structure of the product, or for the product packaging. The personalized customization of a product packaging may include the customization of a packaging box, the customization of a packaging box signature, the customization of a packaging box color, the customization of a packaging box image and the like. In order to improve intellectualization, in an embodiment, the packaging and output module 4 herein includes at least a collaborative robot, a packaging mechanism, and a carton chamber.

The carton chamber stores multiple types of cartons, for example, folding cartons, flip-top cartons, and cover-and-tray cartons. That the customization information in the order information includes a customized cover-and-tray carton is taken as an example. The packaging and output module 4 receives the order information and obtains the customization information in the order information and determines that the carton of the current target product is customized as a cover-and-tray carton. The packaging and output module 4 controls the carton chamber storing cover-and-tray cartons to be ejected. The collaborative robot catches a cover-and-tray carton out of the ejected carton chamber and conveys the cover-and-tray carton to the packaging mechanism. The packaging mechanism receives the cover-and-tray carton, packages the target product, and then performs the output.

In other embodiments, the packaging and output module 4 further includes a laser engraving machine so that personalized customization such as the customization of a signature may be performed on the carton. In other embodiments, the packaging and output module 4 further includes an inkjet printer so that personalized customization such as the customization of colors, images, and head portraits may be performed on the carton. In other embodiments, the packaging and output module 4 further includes a smart camera that cooperates with the collaborative robot and is configured to monitor whether the carton caught by the collaborative robot is consistent with the customization information. In this case, the customization accuracy can be improved.

In one embodiment, the mass customization system includes a mobile conveyor (a flexible conveyor) configured to convey components and products and convey them to specified positions of each module. An electronic tag is attached to the mobile conveyor. The order information of the current order is recorded in the electronic tag. The mass customization system relies on the technology of Radio Frequency Identification (RFID) Internet of Things. Each module reads the electronic tag information in a mobile conveyer through an RFID read-write head integrated in it to obtain the order information. The mass customization system further relies on a programmable logic controller (PLC). Based on the technology of the RFID Internet of Things, a PLC control system automatically parses the order information in the mobile conveyor and then performs module control. The packaging and output module 4 is taken as an example. The PLC control system issues an action instruction to the collaborative robot according to the order information in the mobile conveyor parsed by the RFID read-write head of the packaging and output module. The collaborative robot catches the finished product according to the instruction issued by the PLC control system and cooperates with the packaging mechanism to complete the intelligent packaging task of the finished product.

Figure 3:
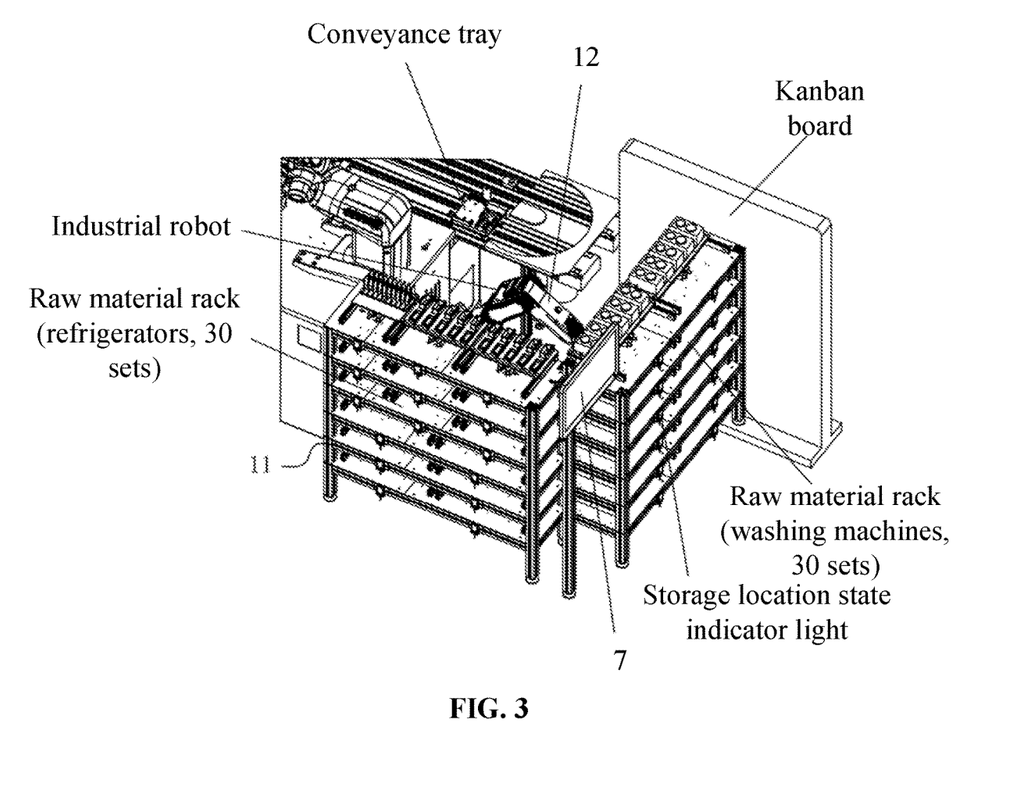
FIG. 3 is a schematic diagram of a raw material stereoscopic warehouse module in a mass customization system according to an embodiment of the present application.

Exemplarily, on the basis of the preceding technical schemes, as shown in FIG. 3, in an embodiment, the raw material stereoscopic warehouse module 1 includes at least one stereoscopic rack 11 and a picking robot 12. The stereoscopic rack 11 is provided with a plurality of storage locations. Each storage location stores at least one type of components. The at least one stereoscopic rack 11 is configured to control at least one corresponding storage location to stretch out or be reset according to the order information.

The picking robot 12 is configured to pick out and output at least one component of a target product from each storage location stretching out.

In this embodiment, the raw material stereoscopic warehouse module 1 is integrated with a warehouse management system (WMS). The raw material stereoscopic warehouse module 1 may include one or more stereoscopic racks 11. The picking robot 12 may be a securely floor-mounted robot on which structures such as a smart camera are integrated.

In this embodiment, a stereoscopic rack 11 is provided with a plurality of storage locations. The stereoscopic rack 11 performs control based on the PLC control system and the technology of the RFID Internet of Things. The address information of each storage location is recorded in the PLC control system. The RFID read-write head may identify the order information in the mobile conveyor. Multiple types of products are placed in each storage location. Products of one type are placed together and correspond to unique location information.

The operation process of the raw material stereoscopic warehouse module 1 is as below. The RFID read-write head of the stereoscopic rack 11 obtains the order information and determines the component information in the order information. The PLC control system controls the storage location consistent with the component information to be ejected or be reset sequentially according to the order information. The picking robot 12 picks out the components of the target product at corresponding positions from the ejected storage location and outputs the components.

For example, the raw material stereoscopic warehouse module 1 is provided with two stereoscopic racks that store the raw materials of no less than thirty refrigerators and thirty washing machines respectively. Each stereoscopic rack is provided with no less than four layers of storage locations. The raw material storage locations of each color may stretch out or be reset according to an instruction of the PLC control system. The picking robot 12 picks out the components of the target product from the ejected storage locations.

In an embodiment, the raw material stereoscopic warehouse module 1 further includes a first image collection unit. The first image collection unit is configured to collect an image of a component caught by the picking robot 12 and detect whether the image of the component matches a component of the target product in the order information. If the image matches the component of the target product in the order information, the first image collection unit sends a component output instruction to the picking robot 12. If the image does not match the component of the target product in the order information, the first image collection unit sends a re-picking instruction to the picking robot 12.

In this embodiment, the first image collection unit may be integrated on the picking robot 12. Under the control of the PLC control system, a mechanical arm of the picking robot 12 moves to the address location where a recorded component of the target product in an ejected storage location is placed. In the catching, the first image collection unit may collect the image of the component to be caught and match the image with a component of the target product in the order information. If the image matches the component of the target product in the order information, the PLC control system controls the picking robot 12 to continue to catch the component of the product and place the component in the mobile conveyor for conveyance. If the image does not match the component of the target product in the order information, the PLC control system controls the picking robot 12 to re-catch a component of a product in the ejected storage location till a component that is the same as the component of the target product in the order information is caught. In an embodiment, the first image collection unit is a smart camera.

In an embodiment, a storage location is provided with a storage location state indicator light and a detection sensor. The storage location state indicator light is configured to indicate a storage location state, where the storage location state includes a stretching-out state and a reset state. The detection sensor is configured to obtain the storage location state and feed back the storage location state to the stereoscopic rack 11.

In this embodiment, each storage location needs to be provided with a storage location state indicator light and a detection sensor. The storage location state indicator light is configured to detect storage location state information and feed back the storage location information via the detection sensor such that the PLC control system judges whether the target storage location is ejected or reset normally. Moreover, the storage location state indicator light can also enhance the user experience and the visualization of order information.

Figure 4:
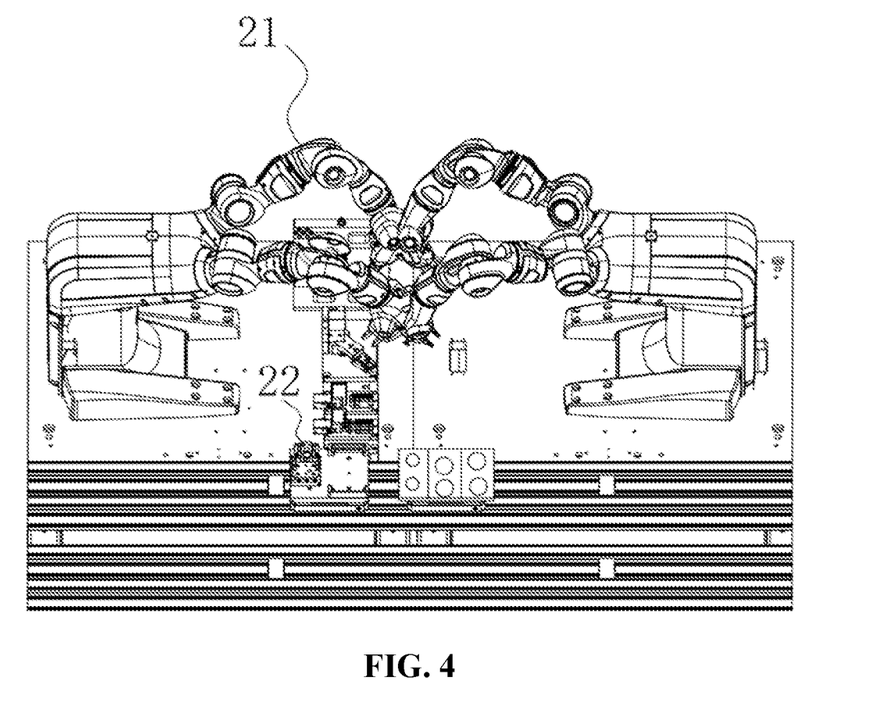
FIG. 4 is a schematic diagram of an accessory assembly module in a mass customization system according to an embodiment of the present application.

Exemplarily, on the basis of the preceding technical schemes, as shown in FIG. 4, in an embodiment, the accessory assembly module 2 includes two first collaborative robots 21 and an auxiliary assembly mechanism 22. The auxiliary assembly mechanism 22 is configured to assist the first collaborative robots 21 in picking out components of a target product. Each of the two first collaborative robots 21 is provided with a second image collection unit. The first collaborative robots 21 are configured to assemble the components of the target product to obtain the target product under the guidance of the images obtained by second image collection units.

In this embodiment, the accessory assembly module 2 is a flexible assembly module. In an embodiment, in the accessory assembly module 2, the first collaborative robot 21 is a dual-arm collaborative robot; the second image collection unit is a vision-guided smart camera; the auxiliary assembly mechanism 22 is an intelligent mechanism capable of positioning and assisting in assembly. The vision-guided smart camera may capture the action of the first collaborative robot 21 in real-time and may also capture the position of the component of the target product. In this case, the positioning guidance can be performed, facilitating the first cooperative robots 21 in performing assembly.

In this embodiment, the operation process of the accessory assembly module 2 is as below. The components of the raw material stereoscopic warehouse module 1 are conveyed to the accessory assembly module 2 through the mobile conveyor; an RFID read-write head integrated in the accessory assembly module 2 reads the electronic tag information in the mobile conveyor. The PLC control system controls the automatic parsing of the order information based on the technology of RFID Internet of Things and then sends an action instruction to the first collaborative robots 21. The first collaborative robots 21 complete the assembly of the entire product through mutual collaboration and the cooperation of the auxiliary assembly mechanism 22 and according to the instruction issued by the PLC control system. After the assembly is completed, the first collaborative robots 21 catch a semi-finished product back to the mobile conveyor; meanwhile the PLC control system writes the order information and production information into the electronic tag of the mobile conveyor through RFID. The semi-finished product flows into the next module with the mobile conveyor.

Figure 5:
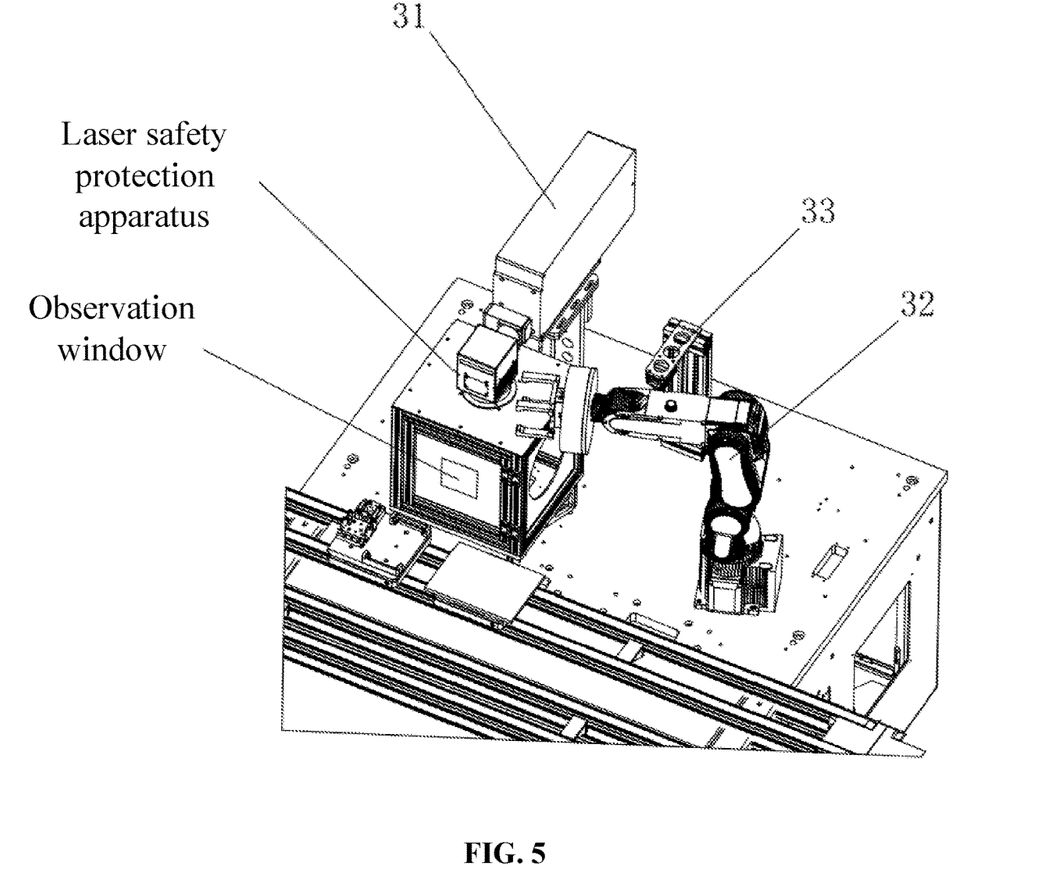
FIG. 5 is a schematic diagram of a customization and detection module in a mass customization system according to an embodiment of the present application.

Exemplarily, on the basis of the preceding technical schemes, as shown in FIG. 5, in an embodiment, the customization and detection module 3 includes a laser engraving machine 31, a second collaborative robot 32, and a visual detection unit 33. The second collaborative robot 32 is configured to catch a target product into the laser engraving machine 31. The laser engraving machine 31 is configured to perform personalized customization on the target product according to the order information. The visual detection unit 33 is configured to detect a finished product after customization according to the order information.

In this embodiment, the customization and detection module 3 may perform personalized customization and visual detection operations and mainly complete tasks of personalized customization of a signature, head portrait printing, and intelligent detection. In an embodiment, the laser engraving machine 31 is an ultraviolet laser engraving machine. A smart camera is integrated on the second collaborative robot 32. In an embodiment, the visual detection unit 33 is a visual detector in which the smart camera is integrated to collect an image of the engraved product for detection.

In this embodiment, the operation process of the customization and detection module 3 is as below. A semi-finished product produced by the accessory assembly module 2 is conveyed to a specified position of the customization and detection module 3. An RFID read-write head integrated in the customization and detection module 3 reads the electronic tag information in a mobile conveyor, where the electronic tag information includes the order information and the order information carries the customization information. A PLC control system sends an action instruction to the second collaborative robot 32 according to the order information automatically parsed based on the technology of RFID Internet of Things. The second collaborative robot 32 catches the semi-finished product from the mobile conveyor to place the semi-finished product inside the laser printing safety protection apparatus under the positioning guidance of the smart camera integrated on the second collaborative robot 32. The laser engraving machine 31 is disposed inside the laser printing safety protection apparatus and completes the engraving task specified in the order information under the control of the PLC control system. After the engraving is completed, the second collaborative robot 32 moves the engraved product to the visual detection unit 33 in the visual detection region under the control of the PLC control system. The smart camera integrated in the visual detection unit 33 collects the image of the product, matches the image with the order information, and detects whether a customization defect exists. If the image matches the order information and no defect exists, the personalized customization is judged successful. If the image does not match the order information or a defect exists, the information is fed back to the PLC control system for processing to perform re-customization or repair. After the visual detection is completed, the second collaborative robot 32 moves the product to the mobile conveyor and outputs the finished product under the control of the PLC control system.

In an embodiment, the customization and detection module 3 is further provided with an observation window on the outer side of the laser printing safety protection apparatus, facilitating that an operator observes the customization content and customization progress of the laser engraving machine 31 through the observation window. In this case, a problem can be handled in time and the product is prevented from being discarded due to a serious error in the customization process.

Figure 6:
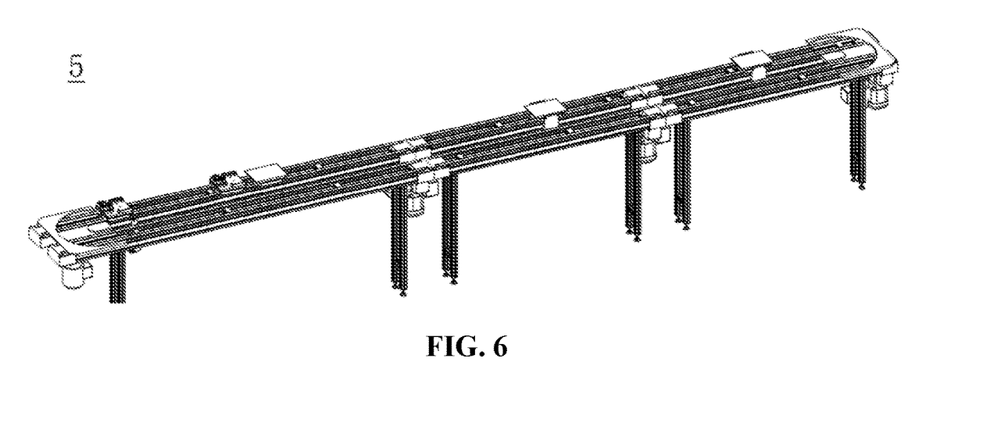
FIG. 6 is a schematic diagram of a mobile conveyor in a mass customization system according to an embodiment of the present application.

Exemplarily, on the basis of any preceding embodiments, as shown in FIGS. 1 and 6, in an embodiment, the mass customization system further includes the mobile conveyor 5 communicating with the raw material stereoscopic warehouse module 1, the accessory assembly module 2, and the customization and detection module 3. The mobile conveyor 5 is configured to convey the target product and the components of the target product.

In this embodiment, the mobile conveyor 5 of the mass customization system is a flexible conveyance conveyor of the mass customization system. A robot in each module may pick out a component of a product from the mobile conveyor for corresponding processing and move the processed component of the product to the mobile conveyor 5 so that the processed component is conveyed to the next module. The mobile conveyor 5 performs the function of transportation positioning of at least one of a product or a component of the product in the mass customization system.

In an embodiment, the mobile conveyor 5 includes a storage unit storing the order information. Each of the raw material stereoscopic warehouse module 1, the accessory assembly module 2, and the customization and detection module 3 is configured to obtain the order information through the storage unit. The mobile conveyor 5 not only has a crawler belt structure for conveying products or components but is also provided with a corresponding electronic tag unit. The storage unit is integrated into the electronic tag unit and may store the order information. The RFID read-write head of each module may read the electronic tag unit of the mobile conveyor 5 and read the order information written into the storage unit. The PLC control system of the mass customization system controls each module to perform a corresponding operation through the order information.

In an embodiment, the mobile conveyor 5 is a flexible conveyance conveyor. For example, the flexible conveyance conveyor uses an internationally popular belt-type conveying belt of a unidirectional-ring shape that conveys materials between a plurality of modules or units. Exemplarily, the mobile conveyor 5 is attached with an RFID electronic tag. Through the conveyance of the conveying belt in the mobile conveyor 5, the mobile conveyor 5 attached with the RFID electronic tag can make a product or component carried on the mobile conveyor 5 reach a specified position of each module. The corresponding position of each module is provided with an RFID read-write head to read the information in the electronic tag of the mobile conveyor 5.

In order to cooperate with the robot of each module to catch materials, the mobile conveyor 5 may perform accurate positioning at the specified position of each module. Moreover, an initial position of the mobile conveyor 5 starts from the raw material stereoscopic warehouse module 1, is conveyed via a plurality of modules, and then returns to the specified position of the raw material stereoscopic warehouse module 1. The mobile conveyor 5 carries out a circulating movement on the conveying belt to implement the continuous conveyance of raw material components or finished products.

Figure 7:
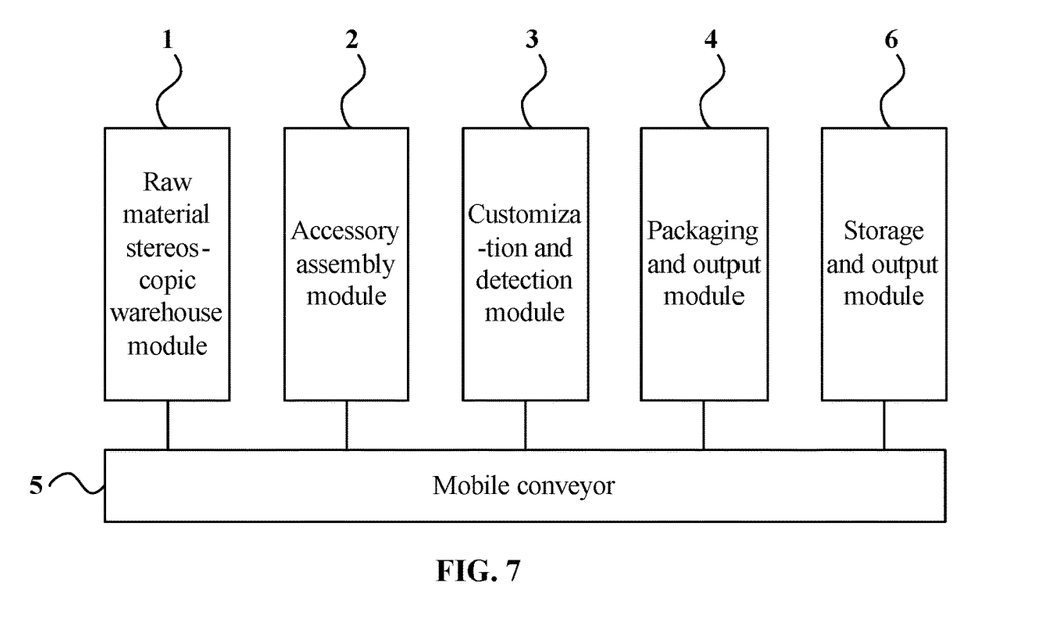
FIG. 7 is a schematic diagram of a mass customization system according to an embodiment of the present application.
Figure 8:
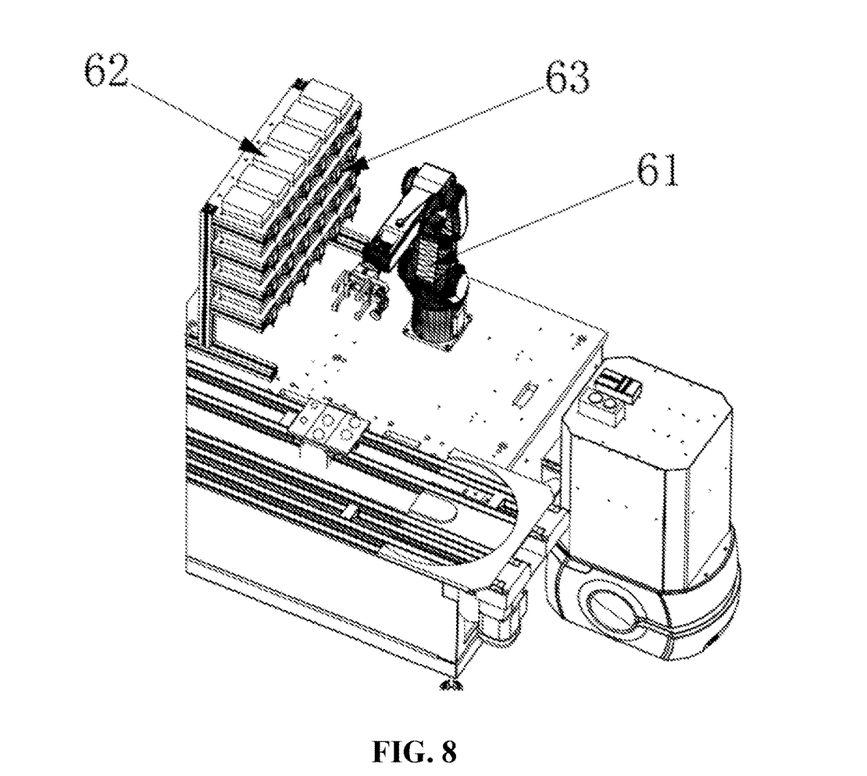
FIG. 8 is a schematic diagram of a storage and output module in a mass customization system according to an embodiment of the present application.

Exemplarily, on the basis of any preceding embodiments, as shown in FIGS. 7 and 8, in an embodiment, the mass customization system further includes a storage and output module 6. The storage and output module 6 obtains a packaged finished product output by the packaging and output module 4 via the mobile conveyor 5, then stores and outputs the packaged finished product. In an embodiment, the storage and output module 6 is mainly composed of a collaborative robot 61 and a stereoscopic finished-product storage rack 62 and mainly performs tasks of storing and outputting finished products. In one embodiment, the collaborative robot 61 is configured to catch the finished product from the mobile conveyor 5 and place the finished product onto the stereoscopic finished-product storage rack 62. Alternatively, the collaborative robot 61 is configured to catch the finished product from the stereoscopic finished-product storage rack 62 and place the finished product onto the mobile conveyor 5 for output. The stereoscopic finished-product storage rack 62 records the position of the finished product and blank positions for subsequent storage or picking. In picking, the storage and output module 6 reads the order information through an RFID read-write head integrated into the storage and output module 6 to determine the position of the finished product to be picked out. In storing, the storage and output module 6 determines a blank position of the stereoscopic finished-product storage rack 62, stores the finished product to be stored in the blank region, and then generates a record in the electronic tag of the mobile conveyor 5 for the RFID read-write head to check.

The PLC control system controls the collaborative robot 61 and the stereoscopic finished-product storage rack 62 to work.

In this embodiment, the operation process of the storage and output module 6 is as below. A finished-product box produced by the packaging and output module 4 is conveyed through the mobile conveyor 5 to a specified position of the storage and output module 6. The RFID reads the electronic tag information in the mobile conveyor 5. The PLC control system issues an action instruction to the collaborative robot 61 according to the order information automatically parsed based on the technology of RFID Internet of Things. The collaborative robot 61 catches the finished-product box and places the finished-product box in a specified storage location in a small stereoscopic finished-product storage rack 62 according to the instruction sent by the PLC control system. If the finished-product box needs to be output, the collaborative robot 61 catches the finished product from the specified storage location in the small stereoscopic finished-product storage rack 62 according to the instruction of the PLC control system and places the finished product onto the mobile conveyor 5 for output.

In an embodiment, the storage and output module 6 further includes storage location indicator lights 63, and each layer of storage locations is provided with a storage location indicator light 63. The storage location indicator light 63 is configured to indicate a state of a corresponding storage location. The storage location state includes the stretching-out state and the reset state so as to facilitate the PLC control system in performing storage location control and state determination.

Exemplarily, on the basis of the preceding technical schemes, in an embodiment, the mass customization system is directly applied in factories. In this case, the mass customization system further includes an order processing server that may directly accept the order information of a plurality of users. Then, the mass customization system directly performs product customization and outputs products according to the order information.

In other embodiments, the mass customization system is further directly applied in exhibition stands for product exhibition. Referring to FIG. 3, the mass customization system further includes a face recognition module 7 disposed outside the raw material stereoscopic warehouse module 1, to facilitate a user to perform face recognition. A face recognition system integrated by the face recognition module 7 may perform the picking and processing of personalized customization and implements the personalized customization of product specifications, signatures, images, and the like to progress to the personalized customization of portraits.

The operation process of the face recognition module 7 is as follows: scanning people nearby and extracting a target photo from the people; then performing binarization for the target photo to implement personalized customization. In this case, the production duration of personalized customization is shortened and the efficiency of personalized customization is enhanced. In addition to implementing personalized customization of face images, the face recognition module 7 can also be used for employee identity authentication so as to improve the security of the mass customization system. For example, the face recognition module 7 scans the scene to obtain the photo of an employee, compares the photo with photos in the database of the mass customization system, obtains the information of the employee identity, and finally grants corresponding permission of the mass customization system according to the identification structure of the employee identity. This improves the security of product usage.

In this embodiment, the arrangement in which the face recognition module 7 is disposed in the mass customization system has the advantage that the order information may be bound with the user's personalized customization information based on the face recognition technology. In this case, the visualization and traceability of the whole process of personalized product production are implemented; and the order is delivered accurately and timely.

Exemplarily, on the basis of the preceding technical schemes, in an embodiment, the device development of the mass customization system is based on the three-dimensional simulation technology. In an embodiment, through the three-dimensional simulation technology, a twin system of virtual-real fusion may be implemented, which may not only simulate all the production processes of the mass customization system offline but also perform the real-time animation display of the running status and order data of the on-site mass customization system. In one embodiment, a digital product in a user's order is modeled in a computer virtual system through the three-dimensional (3D) simulation technology to simulate the actual production process of the mass customization system. Then through the continuous reconstruction of the 3D model, the research, development and generation of the actual mass customization system are finally completed. In this case, the research and development cycle of the mass customization system is greatly shortened, the research and development cost is reduced, and thus the rapid development of the mass customization system is implemented, and the marketing cycle of the mass customization system is shortened.

The 3D simulation technology may further be applied to the production of personalized products in the mass customization system. The digital product in the user's order is modeled in the computer virtual system through the 3D simulation technology to simulate the actual production process of a personalized product in the mass customization system. Then through the continuous reconstruction of the 3D model, the production of the actual personalized product is finally completed. In this case, the production cycle of the personalized product is shortened, the production cost is reduced, and thus the concurrent development of the personalized product and the mass customization system are implemented, and the marketing cycle of the product is shortened.

The mass customization system provided in the preceding embodiments changes the production mode of enterprises in the related art. The essence is that a user inputs the content of personalized customization before production so that the scaled demands of users may be obtained before production. Then the large-scale production is performed by the mass customization system in the manner of modular supply, enabling that personalized products are provided for users with high precision and high efficiency. For example, the high-flexible production of the mass customization system under the premise of modularization can ensure that a plurality of products, a plurality of models, and a plurality of customized elements are produced flexibly in one system and high precision and high efficiency are satisfied.

Mass personalized customization is the core manufacturing mode of intelligent manufacturing and is an important way to adapt to the diversification and individuation of market needs. The mass customization system in embodiments of the present application may serve as a test-verification demonstration system of mass customization. The mass customization system directly converts user needs into production schedules, develops user-centered personalized customization and on-demand production, effectively meets diversified market needs, solves the long-standing inventory problem and production capacity problem in the manufacturing industry, and implements a dynamic balance between production and sales. The mass customization system also greatly exploits the personalized needs of users. The details of all customization products come from the needs of users, reflecting mass customization and satisfying the personalized needs of users. Mass customization and in-depth customization can connect user needs with manufacturing processes of enterprises, implement flexible customized production on demand, promote manufacturing enterprises to accelerate their expansion into service fields, effectively expand the value chain of enterprises, optimize enterprise stocks, and drive profit growth.

Compared with the production mode in the related art, the mass customization system provided in embodiments of the present application may be distinguished from the products on the market and meet the increasing personalized needs of users. Moreover, the mass customization system reduces the customization cost of personalized customization products and shortens the research and development cycle and the production cycle. According to the assembly of a large number of components, the mass customization system can quickly give feedback to market needs and user needs, helping with large-scale production, reducing the pressure of inventory management, improving the problem of inventory backlog, thus improving the capital turnover rate and reducing the inventory cost.

Before the large-scale production of the mass customization system, the mass customization system in embodiments of the present application may serve as a test-verification demonstration system of mass customization for trial and error so as to shorten the cycle of technical application, handling the problem of lacking technology and mode verification in the transformation from the manufacturing mode to the mass customization mode. Additionally, flexible production technology is used in the mass customization system. A plurality of types of products are supported to be produced simultaneously in one verification and demonstration system, which implements the production arrangement, intelligent assembly, intelligent logistics and warehousing of mixed products. Moreover, the states of all devices in the mass customization system are interconnected with a cloud platform. Based on the digital twin technology, the intelligent operation and maintenance of the system are implemented. Additionally, the mass customization system uses the technology of the RFID Internet of Things and the intelligent gateway to implement accurate conveyance of product customization information and process information.

What is claimed is:

1. A mass customization system, comprising:
a raw material stereoscopic warehouse module, which is configured to store a plurality of components for a plurality of types of products and pick out components of a target product according to order information;
an accessory assembly module, which is configured to receive and assemble the components of the target product to obtain the target product; and
a customization and detection module, which is configured to perform product customization on the target product according to customization information carried in the order information, wherein the product customization includes a customization of a signature, a customization of color, head portrait printing, and customized product specifications, height, size, and power;
a face recognition module, which is configured for personalized customization of face images and employee identity authentication;
wherein the raw material, stereoscopic warehouse module comprises at least one stereoscopic rack and a picking robot, wherein
the at least one stereoscopic rack is provided with a plurality of storage locations, each of the plurality of storage locations stores at least one type of components, and the at least one stereoscopic rack is configured to, according to the order information, control at least one corresponding storage location to stretch out or be reset; and
the picking robot is configured to pick out and output at least one of the components of the target product from each storage location stretching out;
wherein the raw material stereoscopic warehouse module further comprises a first image collection unit, wherein
the first image collection unit is configured to collect an image of a component caught by the picking robot, detect whether the image of the component matches a component of the target product in the order information, send a component output instruction to the picking robot based on a detection result that the image of the component matches the component of the target product in the order information, and send a re-picking instruction to the picking robot based on a detection result that the image of the component does not match the component of the target product in the order information.

2. The mass customization system according to claim 1, further comprising: a packaging and output module, which is configured to perform packaging customization on the target product according to the customization information and output a finished product.

3. The mass customization system according to claim 1, wherein each of the plurality of storage locations is provided with a storage location state indicator light and a detection sensor, wherein
the storage location state indicator light is configured to indicate a storage location state, wherein the storage location state includes a stretching-out state and a reset state; and
the detection sensor is configured to obtain the storage location state and feed back the storage location state to the at least one stereoscopic rack.

4. The mass customization system according to claim 1, wherein the accessory assembly module comprises two first collaborative robots and an auxiliary assembly mechanism, wherein
the auxiliary assembly mechanism is configured to assist the two first collaborative robots in picking out the components of the target product; and
each of the two first collaborative robots is provided with a second image collection unit, and the two first collaborative robots are configured to assemble the components of the target product to obtain the target product under guidance of images obtained by second image collection units.

5. The mass customization system according to claim 1, wherein the customization and detection module comprises a laser engraving machine, a second collaborative robot, and a visual detection unit, wherein
the second collaborative robot is configured to catch the target product into the laser engraving machine;
the laser engraving machine is configured to perform personalized customization on the target product according to the order information; and
the visual detection unit is configured to detect a finished product according to the order information after the customization.

6. The mass customization system according to claim 1, further comprising: a mobile conveyor, which is in communication with the raw material stereoscopic warehouse module, the accessory assembly module and the customization and detection module, and configured to convey the target product and the components of the target product.

7. The mass customization system according to claim 6, wherein the mobile conveyor comprises a storage unit storing the order information; and each of the raw material stereoscopic warehouse module, the accessory assembly module, and the customization and detection module is configured to obtain the order information from the storage unit.

* * * * *